Oct. 15, 1963 S. E. SHAPCOTT 3,107,352
RADIO GUIDANCE SYSTEM
Filed Aug. 31, 1959 3 Sheets-Sheet 1

Inventor
By Sidney E. Shapcott
S. J. Rotondi & A. J. Dupont
Attorneys.

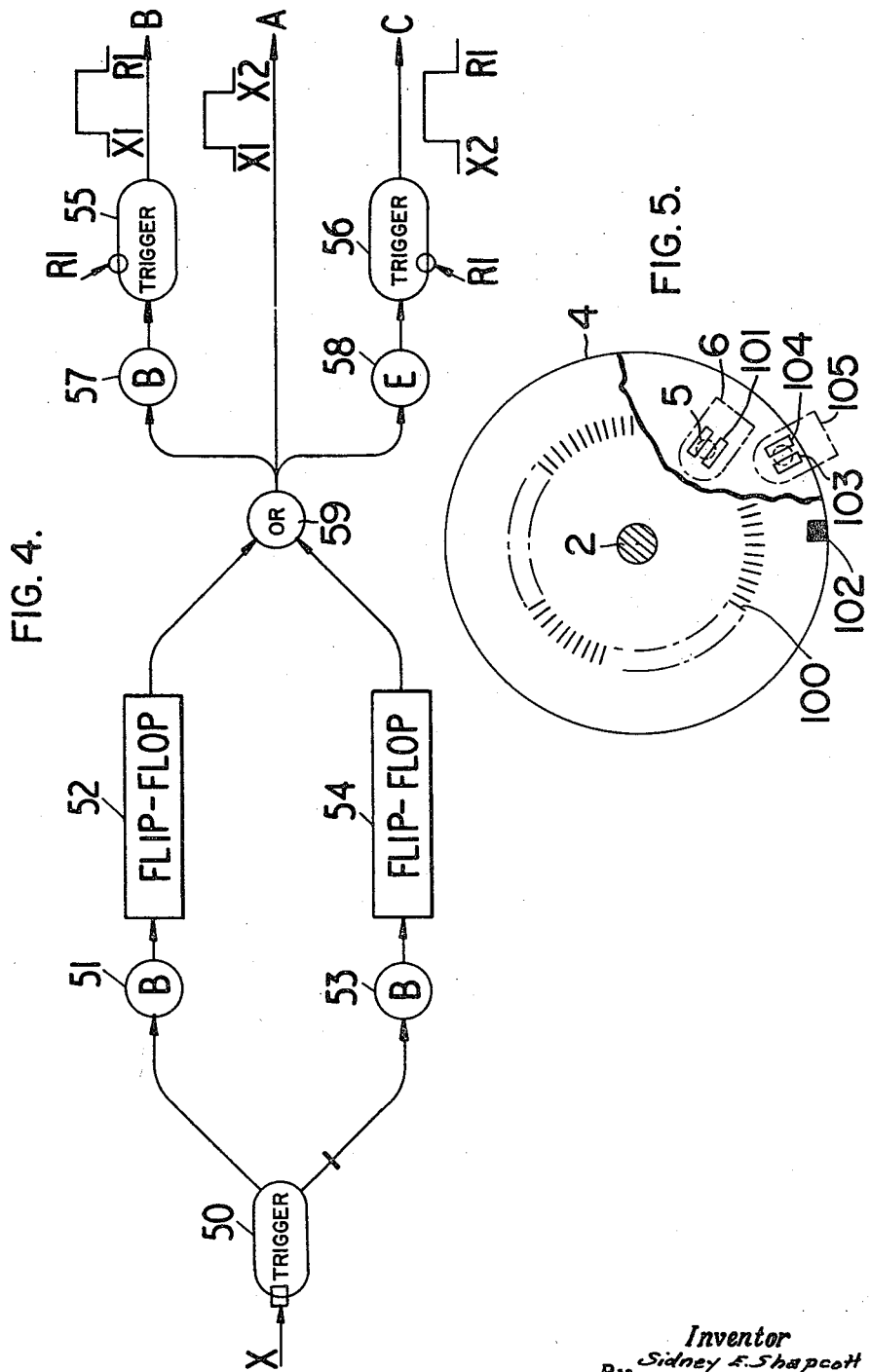

United States Patent Office 3,107,352
Patented Oct. 15, 1963

3,107,352
RADIO GUIDANCE SYSTEM
Sidney Edward Shapcott, 1 Evelyn Ave.,
Aldershot, Hampshire, England
Filed Aug. 31, 1959, Ser. No. 837,279
8 Claims. (Cl. 343—106)

The present invention relates to radio guidance systems for mobile craft such as aircraft, ships and the like.

It is one object of the present invention to provide a guidance system which is capable of considerable accuracy.

According to the present invention, there is provided a radio navigational system including at a transmitting station a directional transmitting aerial arranged to create a scan of its radiation pattern, the radiation pattern being symmetrical in the direction of its movement, means for transmitting one radio-frequency pulse signal from the directional aerial for each regular angular increment of scan of the radiation pattern, means for transmitting a distinctive radio-frequency signal at a datum angle of scan, and at a receiving station means for determining the difference in the number of pulse signals having an amplitude greater than a predetermined amplitude received before the distinctive signal and the number of pulse signals having an amplitude greater than the predetermined amplitude received after the distinctive signal when the distinctive signal is received during the receipt of a substantially regular succession of the said pulse signals.

According to a feature of the present invention, the rate of scan is constant over an arc including the datum angle and there is provided at the receiving station means for determining the time interval between the time of receipt of the distinctive signal and the mean time of receipt of the said regular succession of pulse signals with means for distinguishing between the cases when the distinctive signal is received respectively before or after receipt of the regular succession of pulse signals. The directional transmitting aerial is preferably arranged to produce a continuous constant rate of scan in azimuth.

Embodiments of the present invention will now be described by way of example with reference to the accompanying drawings in which:

FIGURE 4 is a block circuit diagram of part of the receiving station shown in FIGURE 3; and FIGURE 5 is a view of part of the transmitting station showing a part cut-away plan view of disc 4.

Figure 1:
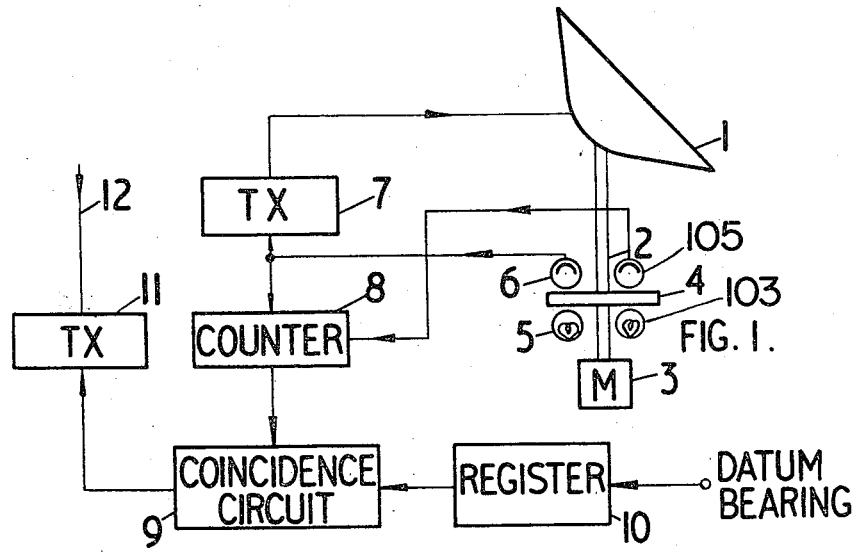
FIGURE 1 is a schematic diagram of a transmitting station used in the system.

FIGURE 1 shows a directional aerial 1 arranged for rotation on a vertical shaft 2 by means of a motor 3. The aerial 1 has a symmetrical radiation pattern in the direction of scan of the radiation pattern caused by the movement of the aerial. The aerial is so constructed that the intensity of radiation in the side lobes of the radiation pattern is much less than in the main part of the pattern so that a receiver may easily be adjusted to accept signals from only the main part of the radiation pattern. The shaft 2 carries a transparent disc 4 (FIG. 5) marked with short opaque radial lines 100 at, say, every one thousandth of a radian of rotation. For the purposes of this specification, one-thousandth of a radian will be considered to be 1/6400 part of 2π radians. A lamp 5 illuminates a slit 101 which lies radially of the disc 4 and a photo-electric cell 6 senses the passing of each line past the slit as the shaft 2 rotates. The aerial and the shaft 2 are arranged to rotate approximately one complete revolution every two seconds.

The output of the photo-electric cell 6 modulates a transmitter 7 so that it transmits a pulse through the aerial 1 each time a line passes the slit. The output of the photo-electric cell 6 is also applied to a counter 8 which is arranged to be reset once each revolution of the shaft at some convenient reference bearing as the shaft rotates. The resetting of the counter 8 may be effected by the output of a separate photo-electric cell, lamp and slit arrangement as shown in FIGURE 5 wherein the disc 4 additionally carries a fiducial mark 102 illuminated by a lamp 103 via a slit 104. Light falls on a photo-electric cell 105 except when intercepted by the mark 102. The output of the photo-electric cell 105 is thus applied to the counter 8 to reset it. The output of the counter 8 thus normally represents the bearing along which the beam of the aerial 1 is pointing relative to the reference bearing in terms of so many thousandths of a radian.

The output of the counter 8 is fed to a coincidence circuit 9 where it is compared with a datum bearing set up on a register 10. The datum bearing may be any chosen bearing relative to the reference bearing and is expressed in thousandths of a radian as is the output of the counter 8. The datum bearing is that bearing with respect to which it is desired to navigate a mobile craft carrying the receiving equipment to be described hereinafter with reference to FIGURE 2. When coincidence is obtained between the output of the counter 8 and the number held in the register 10, the coincidence circuit 9 emits an output to pulse having a definite, constant width modulate a transmitter 11 with a marker pulse. This marker or datum radio-frequency pulse is transmitted from an omnidirectional aerial 12 once each revolution of the aerial 1 at the desired datum bearing. It will, of course, be realized by those versed in the art that the transmitters 7 and 11 must operate on separate carrier frequencies.

Figure 2:
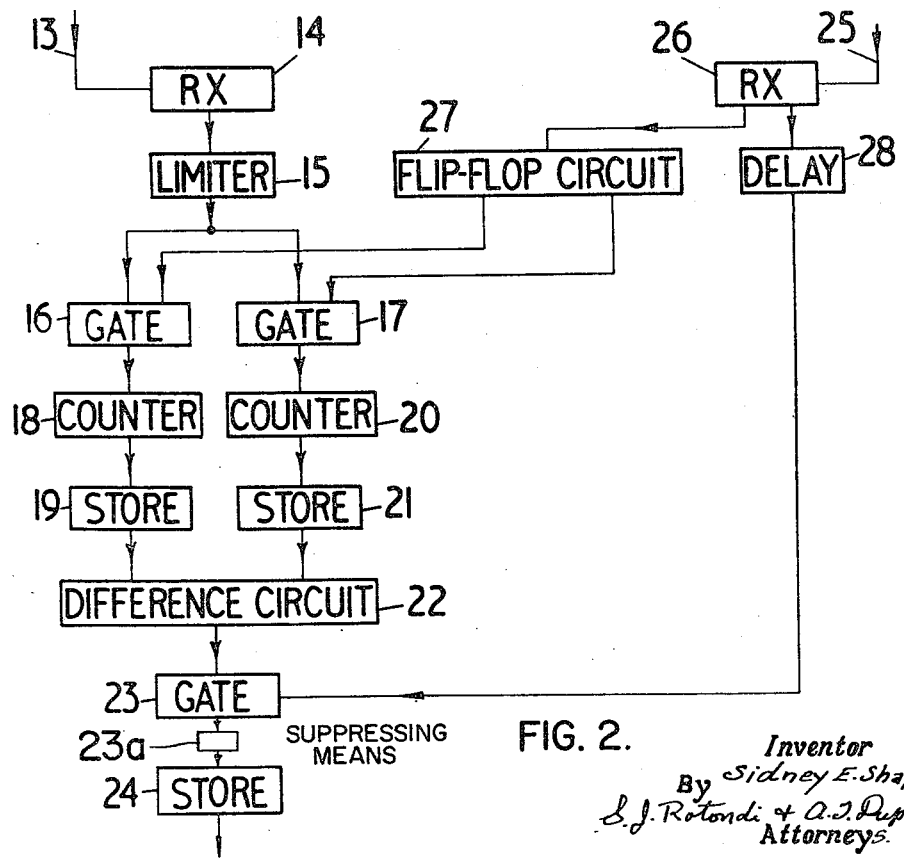
FIGURE 2 is a block circuit diagram of a receiving station for use in a mobile craft employing the system.

FIGURE 2 shows an omnidirectional aerial 13 and a receiver 14 for receiving transmissions having an amplitude greater than those from the side lobes of the radiation pattern of the directional aerial 1. The receiver 14 feeds a limiter 15 the output of which is applied to two gates 16 and 17. The gate 16 feeds a counter 18 the output of which is stored in a store 19. A similar counter 20 and store 21 are operated by the output of the gate 17. The output of the stores 19 and 21 are fed to a difference circuit 22 which produces the algebraic sum between the counts held in the stores. The output circuit 22 is fed to a gate 23 and thence to a store 24.

A further omnidirectional aerial 25 and a receiver 26 receive signals from the omnidirectional aerial 12 (FIGURE 1). Each time a pulse signal is received, a flip-flop circuit, 27, which normally holds the gate 16 open and the gate 17 closed, is triggered to open the gate 17 and close the gate 16. The flip-flop circuit may be any suitable mono-stable circuit and is arranged to regain its original state (holding the gate 16 open and the gate 17 closed) after a suitable delay of, say, one second. Each received pulse signal is also fed to the gate 23 via a delay unit 28 so that the output of the difference circuit 22 is fed to the store 24. The necessity for the delay will become apparent as the description proceeds.

All the apparatus shown in FIGURE 2 is carried on a mobile craft. The operation of the receiving arrangement shown in FIGURE 2 in conjunction with the transmitting arrangement shown in FIGURE 1 will now be described. The transmitting directional aerial 1 (FIGURE 1) has a symmetrical polar diagram in azimuth. That is to say, the polar diagram is symmetrical about the bearing recorded to the nearest thousandth of a radian on the counter 8. Let it be assumed that the mobile craft carrying the equipment shown in FIGURE 2 is within one beam width of the aerial 1 (say, less than one degree) from the datum bearing. Then, as the aerial 1 rotates, the receiver 14 will at some point receive pulses therefrom at each thousandth of a radian rotation of the aerial 1. The receiver 14 is arranged to respond only to signals of a predetermined amplitude whilst the limiter 15 standardizes the amplitude of the output pulses of the receiver. The gate 16 being normally open, the counter 18 receives the pulses when they attain the predetermined amplitude and starts counting. When the aerial 1 reaches the datum bearing, the transmitter 11 (FIGURE 1) transmits a pulse which is received by the receiver 26 (FIGURE 2). The flip-flop 27 is triggered to close the gate 16 and open the gate 17 so that the counter 18 ceases to count and the counter 20 begins to count. The counter 20 continues to count until the pulses received at the receiver 14 fall below the same predetermined amplitude at which the counter 18 began to count. Thus the counter 18 then holds a count of the number of pulses above a given amplitude received before the aerial 1 has reached its datum bearing whilst the counter 20 holds a count of the number of pulses above the given amplitude received after the aerial 1 has reached its datum bearing. It follows that if the counters record equal counts the craft lies on the datum bearing, whilst if one counter records a count greater than that of the other counter, the craft lies on one side or the other of the datum bearing. The difference in the two counts, therefore, gives the number of half thousandths of a radian the craft is off the datum bearing from the aerial 1 and the sign of the difference gives the necessary information as to which side of the datum bearing the craft lies. This difference in the two counts is given by the difference circuit 22.

As hereinbefore explained, the difference circuit receives the two counts from the counters 18 and 20 via the stores 19 and 21 respectively. When the counting has ceased, the gate 23 is opened for a sufficient time to allow the difference in counts to be passed to the store 24. The required bearing information may then be read from the store by any suitable means. The content of the store is cleared before each new insertion of a difference in counts. The counters 18 and 20, the stores 19 and 21 and the difference circuit 22 are cleared as soon as their contents are no longer required in the operation of the apparatus. Each clearance may be done under the control of pulses from the receiver 26 delayed by delay units (not shown) having appropriate delay periods.

It will be apparent that if the craft does not lie within the beam width of the aerial 1 from the datum bearing, no output, or a false output, will be obtained from the difference circuit 22 and, therefore, it would appear that the craft was on the datum bearing or some other false bearing related to the datum bearing. This difficulty may be overcome by suppressing the output of the gate 23 whenever there is a time lag between the receipt of a marker pulse from the aerial 12 and the receipt of pulses from the aerial 1. The suppressing means 23a for gate 23 is shown in block diagram, FIGURE 2, and consists of electronic suppressing means. This situation indicates that the craft is more than a beam width of the aerial 1 away from the datum bearing.

A coarse, i.e. approximate indication of bearing, when the craft is more than a beam width of the aerial 1 off the datum bearing, may be obtained if the rate of rotation of the aerial 1 is known approximately and the time interval is measured between the receipt of a marker or datum pulse from the aerial 12 and the receipt of maximum amplitude of pulses received from the aerial 1. The measurement of this time interval may be achieved by measuring the time beteen the marker pulse and the onset of pulses above a predetermined amplitude received at the receiver 14 and also measuring the time between the marker pulse and the cessation of pulses above the predetermined amplitude received at the receiver 14 and taking the mean of the two times. This may be carried out in any known manner, for example, by means of the well-known phantastron circuits or other linear time-base circuits. After the time interval is known, it is a simple matter to multiply it by the speed of rotation of the aerial expressed in appropriate units to obtain the bearing of the craft from the aerial 1 relative to the datum bearing.

The transmission from the transmitter 11 and the aerial 12 may be coded so that a receiver on a particular craft will respond only to a transmission of a pulse group representing the datum bearing for that particular craft. In that case a number of coincidence circuits (such as the circuit 9) and registers (such as the register 10) may be provided. It will be appreciated that the datum bearing may be varied at will for any particular craft by varying the numbers set up in the registers. Further other information (e.g. in time division multiplex) may be transmitted by the transmitter 11 and aerial 12.

An alternative system of obtaining coarse and fine indications of bearing, but embodying the general principles of the present invention, employs only one transmission instead of two. That is to say, the counter 8, the coincidence circuit 9, the register 10, the transmitter 11 and the aerial 12 of FIGURE 1 and the receiver 26 and aerial 25 are no longer required, all the information being carried on the one channel through the transmitter 7 and receiver 14. In this case, the transmitter 7 and aerial 1 are arranged to transmit a coded pulse group indicating the coarse bearing relative to a reference bearing at one degree intervals of rotation of the aerial 1 in time-division multiplex with the pulses transmitted every thousandth of a radian rotation. The coarse bearing coded pulse group may be obtained from the disc 4 by means of an illuminated slit and photo-electric cells in known manner and may be decoded by known delay line and gating techniques at the receiver 14 to give a coarse indication of the bearing and to operate the flip-flop 27 and the gate 23.

In this alternative system the beam width of the aerial 1 is made slightly greater than one degree. The mobile craft thus receives a series of pulses, one at each thousandth of a radian of rotation of the aerial 1 with one coded pulse group (representing coarse bearing) somewhere in between them. By adding the pulses received before the arrival of a pulse group and subtracting the pulses received after the arrival of the pulse group, a fine measure of bearing is obtained. It will be appreciated by those versed in the art that the fine measurement of bearing by the above-described systems is independent of the speed of rotation of the aerial 1.

One particular embodiment of the invention for providing both coarse and fine indications of bearing will now be described with reference to FIGURES 3 and 4.

Figure 3:
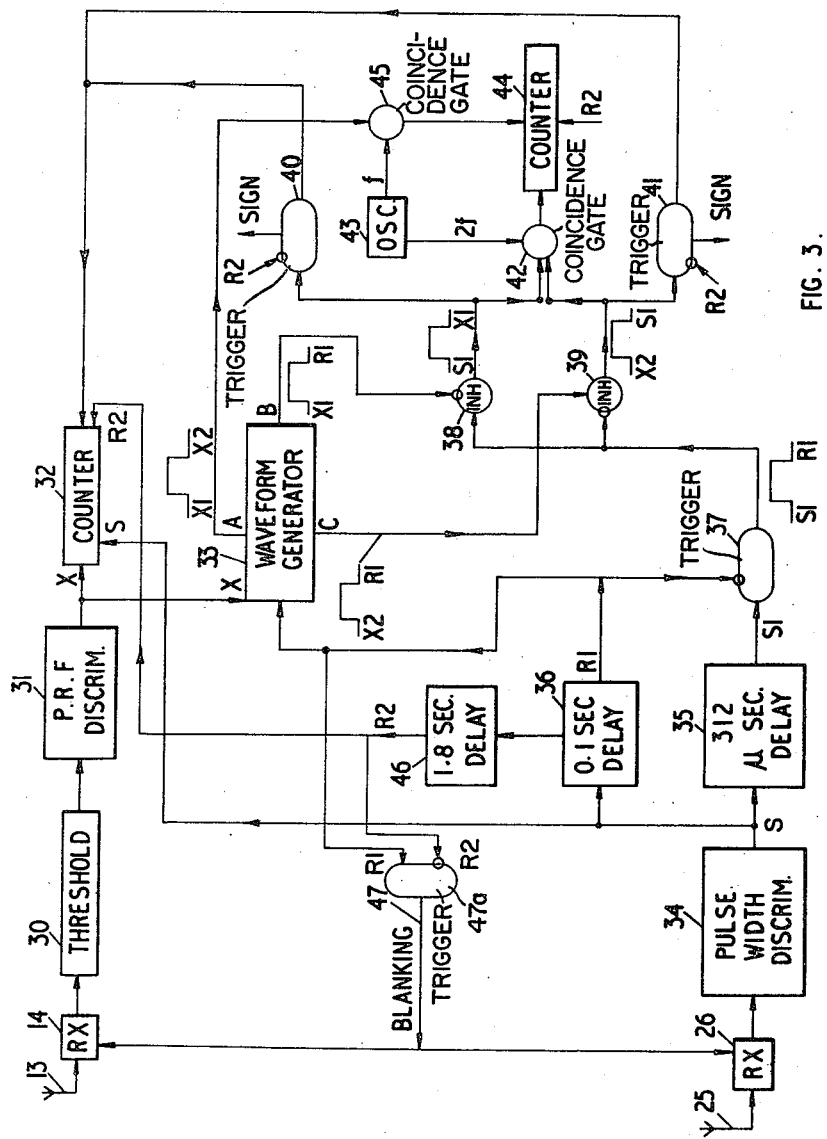
FIGURE 3 is a block circuit diagram of an alternative receiving station for use in a mobile craft employing the system.

FIGURE 3 is a block schematic diagram of a receiver system for providing both a coarse and a fine indication of bearing of a mobile craft with respect to a datum bearing. Where appropriate, the symbolic notations used for triggers and gates in FIGURES 3 and 4 are the same as that used for similar devices in U.S. Patent No. 2,686,632 granted on August 17, 1954, to J. H. Wilkinson.

The receiver system shown in FIGURE 3 is designed for use with the transmitter system shown in FIGURE 1 in which the directional aerial 1 rotates at a constant rate one complete revolution every two seconds. FIGURE 3 shows a receiving aerial 13 and receiver 14 for receiving radio-frequency pulses from the directional aerial 1 of FIGURE 1. The video-frequency output of the receiver 14 is applied to a threshold device 30 which passes only signals above a predetermined amplitude. This prevents interference from the side lobes of the radiation pattern of the aerial 1. These signals are applied to a pulse recurrence frequency discriminator 31. This discriminator passes only pulses having a recurrence rate of 3,200 pulses per second which is the rate of recurrence of the pulses from the aerial 1 (FIGURE 1) and may consist of a delay and gating system of any known form. Pulses (X pulses) from the discriminator 31 are applied to a reversible counter 32 and to a waveform generator 33. It is an inherent property of a pulse recurrence frequency discriminator that the first pulse appearing at its output is the second pulse of a pulse train applied to it. Thus one pulse (the first) of a pulse train applied to it is absent from the pulse train applied to the counter 32 and the waveform generator 33 and allowance is made for this in manners hereinafter described.

An aerial 25 and a receiver 26 receive radio-frequency datum pulses from the aerial 12 (FIGURE 1) and the resulting video-frequency datum pulses from the receiver 26 are applied to a pulse-width discriminator 34 which passes only pulses of the same width as are transmitted from the aerial 12. The two discriminators 31 and 34 serve to reduce the possibility of interference from other transmissions on similar frequencies. The output (S pulses) from the pulse-width discriminator 34 is applied to the reversible counter 32 so that the counter counts the X pulses in a positive direction until an S pulse is received when it counts the X pulses in a negative direction. By this means, the counter 32 provides a positive or negative count indicating the bearing with respect to a datum bearing in half-thousandths of a radian as in the case of the system of FIGURE 2. In order to correct for the loss of the first X pulse in the discriminator 31, the counter is always reset to one greater than zero before counting takes place. The counter 32 provides the correct count only when an S pulse arrives at the receiver system during the time of receipt of a train of X pulses. Otherwise the counter 32 provides a count proportional to the time of receipt of the X pulses which will normally be proportional to the beam width of the aerial 1 (FIGURE 1). However, in such circumstances the continued operation of the counter 32 may be inhibited and the counter reset if necessary in a manner to be described hereinafter.

The output of the pulse-width discriminator 34 is also applied to a 312 microseconds delay unit 35 the output of which provides pulses which will hereinafter be called S1 pulses. By this means the original S pulses are delayed by the same amount as the delay in the onset of pulses from the pulse recurrence frequency discriminator 31 (that is to say, by one interpulse period of the X pulses), thus placing the S1 pulses and the X pulses in the correct time relationship to one another. The output of the pulse-width discriminator is also applied to a 0.1 second delay unit 36, the output of which provides a reset pulse R1 occurring 0.1 second after the received S pulse. The S1 and R1 pulses are applied to a trigger 37 so that it is put on for approximately 0.1 second between pulses S1 and R1.

The reset R1 pulses are also applied to the wave form generator 33 which will be described hereinafter in greater detail with reference to FIGURE 4. The waveform generator 33 provides three outputs A, B and C. The output A commences at a time X1 which is the time of receipt of the first X pulse (that is, the second pulse applied to the discriminator 31) and ends at a time X2 occurring approximately 350 microseconds after the time of occurrence of the last X pulse. The period X1 to X2 is approximately equal to the period of receipt of any pulse train or regular succession of pulses at the pulse recurrence frequency discriminator 31, the 350 microseconds additional time compensating approximately for the 312 microseconds lost in the derivation of the first X pulse.

The output B of the generator 33 is arranged to commence at time X1 and end at the time of occurrence of an R1 pulse and the output C is arranged to commence at time X2 and end at the time of occurrence of an R1 pulse.

The output of the trigger 37 is applied to the input of an inhibiting gate 38 and the output B is applied to the inhibiting input of this gate. An output is obtained from this gate, therefore, only when a pulse S1 occurs before X1 and then for the period of time between the time of occurrence of a pulse S1 and X1. The output of the trigger 37 is also applied to the inhibiting input of an inhibiting gate 39 to the other input of which the waveform C is applied. An output is obtained from this gate, therefore, only if X2 occurs before the time of occurrence of a pulse S1 and then for the period of time between X2 and the time of occurrence of a pulse S1. The outputs of the two gates 38 and 39 are applied separately to two triggers 40 and 41 respectively so that the trigger 40 is put on when S1 occurs before X1 and the trigger 41 is put on when X2 occurs before S1. The outputs of triggers 40 and 41 are applied to counter 32 as shown in FIGURE 3.

The outputs of the triggers 40 and 41 are each applied to a neon indicator (not shown) to light the corresponding neon when the trigger is on, thereby indicating whether a pulse S1 occurs before X1, or alternatively, whether X2 occurs before a pulse S1. At first sight it might appear that these two conditions were the same, but it will be seen from the following description that the system is prevented from operating except for a 0.1 second period before and a 0.1 second period after the receipt of an S pulse at the receiver 26. When either of the sign triggers 40 and 41 is on (or the corresponding neon is lit) the count in the counter 32 is ignored or, alternatively, the continued operation of the counter 32 may be inhibited and the counter reset if necessary when either of the triggers is on.

Outputs of the two gates 38 and 39 are applied together to a coincidence gate 42 to which a pulse output of an oscillator 43 is also applied. This pulse output has a recurrence frequency of $2f$ ($=3,200$) pulses per second which corresponds to one pulse for every thousandth of a radian of rotation of the aerial 1 (FIGURE 1). The output of the coincidence gate 42 is applied to a counter 44 which by this means is made to record a count of pulses in terms of so many thousandths of a radian of movement of the aerial 1 (FIGURE 1) between the occurrences of a pulse S1 and X1 or, alternatively, the occurrences of X2 and a pulse S1. The counter 44 is also fed with pulses from a coincidence gate 45 which is opened by the output A of the waveform generator 33 during the time X1 to X2 to pass pulses at a recurrence frequency of $f$ ($=1,600$) pulses per second from the oscillator 43. It follows that this part of the count will contribute to the number recorded in the counter 44 a count in thousandths of a radian equivalent to half the beam width of the aerial 1 (FIGURE 1). Thus, if a pulse S1 occurs before X1 or after X2 and either one of the neon indicators (not shown) operated by the triggers 40 and 41 is lit, the total number recorded in the counter 44 will be an approximate indication of the number of thousandths of a radian of bearing that the craft carrying the receiving station lies from the datum bearing.

If neither of the neon indicators is lit, a pulse S1 occurs between X1 and X2 and the counter 44 merely records a number corresponding to half the beam width of the aerial 1 (FIGURE 1), the number being a count of the number of pulses of recurrence frequency of occurring between X1 and X2. In these circumstances the bearing of the craft from the datum bearing is taken from the counter 32.

The counters 32 and 44 are reset and the trigger 40 or the trigger 41 is put off by means of a reset pulse R2 derived from the reset pulse R1 through a 1.8 seconds delay unit 46. This ensures that the counters and sign indicators are reset 1.9 seconds after the receipt of an S pulse and approximately 0.1 second before the receipt of the next S pulse. In order to prevent false operation of the receiver system, and especially of the counter 44, blanking pulse 47 is applied to the receivers 14 and 26 for a period extending from the time of occurrence of a reset pulse R1, 0.1 second after the receipt of an S pulse, to the time of occurrence of a reset pulse R2, 1.9 seconds after receipt of an S pulse. This pulse may be generated by applying pulses R1 to an electronic trigger 47a to put it on and R2 pulses to the trigger 47a to put it off. The output 47 of the trigger is then applied to both of the receivers to prevent them from operating.

Because of the blanking pulse, the receiver system does not respond to pulses received from the aerial 1 (FIGURE 1) unless they occur within a period commencing 0.1 second before and ending 0.1 second after the receipt of an S pulse at the receiver 26. It follows from the above description that the receiver system is effective only when the craft carrying the system receives all the pulses above the threshold amplitude from the directional aerial 1 (FIGURE 1) as it rotates within a period starting 0.1 second before and ending 0.1 second after the receipt of the datum S pulse. That is to say, if the effective beam width of the aerial 1 (FIGURE 1) is approximately one degree and the aerial 1 rotates 18 degrees in 0.1 second, the craft must lie on a bearing within ±17½ degrees from the datum bearing so that all pulses from the aerial 1 are received in the 0.2 second period or else the counter 44 will not show an accurate reading. It will be seen, for example, by referring to FIGURE 3, that if no X pulses pass through the receiver 14 due to the 1.8 seconds blanking period, then the output of the gate 38 will extend from the time of occurrence of the S1 pulse to the time of occurrence of the R1 pulse (i.e. 0.1 second) and the counter 44 will record 320 thousandths of a radian. Clearly this occurs whenever the craft is more than 18½ degrees from the datum bearing. If, however, the craft is 17½ degrees from the datum bearing, the counter 44 will count approximately 302 ($=3200 \times {}^{17}\!/_{180}$) pulses at a recurrence frequency of $2f$ during the period from the time of occurrence of a pulse S1 to X1 or, alternatively, during the period X2 to the time of occurrence of a pulse S1 and 9 pulses at a recurrence frequency of $f$ during the period X1 to X2. The total count will, therefore, be approximately 311 thousandths of a radian. However, if the craft is more than 17½ from the datum bearing, the count at a recurrence frequency of $2f$ will last for a longer time and the count at a recurrence frequency of $f$ will last for a correspondingly shorter time since either occurrence X1 or, alternatively, occurrence X2 will occur, if either occurs at all, at a time governed not by the receipt of the first or last pulse above a predetermined amplitude received from the aerial 1 (FIGURE 1) at the aerial 13 (FIGURE 3), but by the blanking pulse. In these circumstances, the count recorded in the counter 44 will be greater than 311 and is ignored as not being an accurate reading. It follows that a count lying between 311 and 320 in the counter 44, together with the sign indication will only provide an indication of the sense in which the craft is off the datum bearing whilst a count of 320 or above has no meaning at all.

FIGURE 4 is a circuit diagram of the waveform generator 33 shown in FIGURE 3. FIGURE 4 shows a trigger 50 supplied at a change-over input with X pulses so that it is alternately put on and off by successive X pulses. The output of the trigger 50 is applied to a beginning element 51 which produces a pulse, when the trigger 50 is put on, to set a mono-stable or flip-flop circuit 52. The negated output of the trigger 50 is applied to a beginning element 53 which produces a pulse when the trigger 50 is put off, to set a flip-flop circuit 54. The X pulses arrive at 312 microsecond intervals and so that the state of the trigger is changed once each 312 microseconds. The flip-flop circuit 52 is, therefore, set once every 624 microseconds in effect by every alternate X pulse and the flip-flop circuit 54 is set every 624 microseconds in effect by the remaining X pulses. The flip-flops 52 and 54 each have a reset time of 350 microseconds so that their times for which they remain set overlap and their combined output at A (after re-shaping if necessary) is a square wave beginning at the time of receipt of the first X pulse (time X1) and ending (at time X2) 350 microseconds after the receipt of the last X pulse. The square wave, therefore, begins at time X1, 312 microseconds after the receipt of the first pulse at the receiver 14 (FIGURE 3), because one pulse is lost in the pulse recurrence frequency discriminator 31 (FIGURE 3). The 350 microseconds' delay after the receipt of the last pulse, before the end of the square wave, approximately compensates for the loss of the first pulse so that the time X1 to X2 is approximately equal to the time for which pulses are passed by the threshold circuit 30 (FIGURE 3). The square wave occurring from X1 to X2 is applied separately to two triggers 55 and 56 through a beginning element 57 and an end element 58 respectively. The flip-flops 52 and 54 are coupled to beginning elements 57 and 58 through OR gate 59 as shown in FIGURE 4. The triggers 55 and 56 are put off by an R1 pulse. By this means the output B from the trigger 55 consists of a pulse lasting from X1 to the time of occurrence of an R1 pulse whilst the output C from the trigger 56 consists of a pulse lasting from X2 to the time of occurrence of an R1 pulse. These pulses are applied to gates 38 and 39 as hereinbefore described with reference to FIGURE 3.

The above-described embodiments employ an aerial 1, which is continuously rotated in azimuth. The aerial 1 need not, however, be continuously rotated but may be scanned back and forth as long as suitable means are provided to compensate for the change in direction of scan in the counting and sign circuits. For example, when the pulses received at the aerial 25 (FIGURES 2 and 3) are received during the period of receipt of pulses at the aerial 13 (FIGURES 2 and 3), then the number of pulses received at the aerial 13 after the receipt of a pulse at the aerial 25 would have to be effectively subtracted from the number of those pulses received before the pulse at the aerial 25 for one direction of scan and the number of pulses received before the receipt of a pulse at the aerial 25 would have to be effectively subtracted from the number of pulses received after the receipt of a pulse at the aerial 25 for the reverse direction of scan. The operation of the sign triggers 40 and 41 (FIGURE 3) may similarly be reversed.

The coarse bearing indicator, such as the counter 44, depends for its accuracy upon a constant scanning rate of the aerial 1. Clearly, if the aerial is scanned back and forth, the operation of the system has to be limited to an arc of scan about the datum bearing over which the scanning rate is substantially constant.

Although, in the embodiment of FIGURES 3 and 4, the receiving system is limited by the 1.8 seconds blanking pulse to the guidance of a craft only when it is on a bearing within ±17½ degrees of a datum bearing, clearly the system may be extended to operate, if required, over any range of angles in azimuth or even elevation.

I claim:

1. A radio navigational system including at a transmitting station a narrow beam directional transmitting aerial arranged to create a scan of its radiation pattern, the radiation pattern being symmetrical in the direction of its movement, means for transmitting one radio-frequency pulse signal from the directional transmitting aerial for each regular angular increment of scan of the radiation pattern, means for transmitting a distinctive radio-frequency signal at a datum angle of scan, and at a receiving station means for computing the difference in the number of pulse signals having an amplitude greater than a predetermined amplitude received between leading edge of said radiation pattern and before the distinctive signal and the number of pulse signals having an amplitude greater than the predetermined amplitude received between the distinctive signal and trailing edge of said radiation pattern when the distinctive signal is received during the receipt of a substantially regular succession of the said pulse signals.

2. A radio navigational system as claimed in claim 1 and wherein the said directional transmitting aerial has a rate of scan which is constant over an arc including the datum angle and wherein there is provided at the receiving station means for computing the time interval between the time of receipt of the distinctive signal and the mean time of receipt of the said regular succession of pulse signals with means of distinguishing between the cases when the distinctive signal is received respectively before or after receipt of the regular succession of pulse signals.

3. A radio navigational system as claimed in claim 2 and wherein the narrow beam directional transmitting aerial is arranged to produce a continuous constant rate of scan of the radiation pattern in azimuth.

4. A radio navigation system as claimed in claim 3 wherein said receiving station means for computing the difference in the number of pulse signals received before and the number of pulse signals received after the distinctive signal includes a first counter, a second counter, a gating arrangement for applying pulse signals to either only the first counter or only the second counter, means for controlling the gating arrangement to apply pulse signals to the first counter before the receipt of a distinctive signal and to apply pulse signals to the second counter after the receipt of a distinctive signal and subtractor means for computing the difference in the numbers held in the counters after all the pulse signals of a regular succession of pulse signals has been received.

5. A radio navigation system as claimed in claim 4 wherein said means for controlling the gating arrangement includes a monostable flip-flop circuit arranged to be set into an unstable state on the receipt of a distinctive signal and to revert to its stable state before receipt of a further regular succession of pulse signals.

6. A radio navigation system as claimed in claim 5 wherein the means for computing the difference in the number of pulse signals received before and the number of pulse signals received after the distinctive signal includes a reversible counter, means for applying pulses derived from the said pulse signals to the counter and means for reversing the count of the counter on receipt of a distinctive signal.

7. A radio navigational system as claimed in claim 6 and wherein the narrow beam directional transmitting aerial is rotated about an axis and wherein the means for transmitting one radio-frequency pulse signal for each regular increment of scan includes a transparent disc marked with opaque radial lines equally angularly spaced and arranged to be rotated with the aerial, an optical device arranged to co-operate with the disc so as to produce a pulse output each time an opaque radial line moves past a predetermined position and means for modulating a transmitter with the said pulse output.

8. A radio navigational system as claimed in claim 7 and wherein the means for transmitting a distinctive radio-frequency signal at a datum angle of scan includes a counter for counting the number of pulses produced by the said pulse output, means for resetting the counter at a reference position of the aerial, a numerical register on which the datum angle of scan is set up as a number of angular increments of scan, a coincidence circuit for producing an output when the content of the register is equal to the content of the counter and means for generating the distinctive signal when an output is produced by the coincidence circuit.

References Cited in the file of this patent

UNITED STATES PATENTS

| | | |
|---|---|---|
| 2,184,843 | Kramar | Dec. 26, 1939 |
| 2,566,831 | Grosdoff | Sept. 4, 1951 |
| 2,661,467 | Jones | Dec. 1, 1953 |